United States Patent Office 3,180,614
Patented Apr. 27, 1965

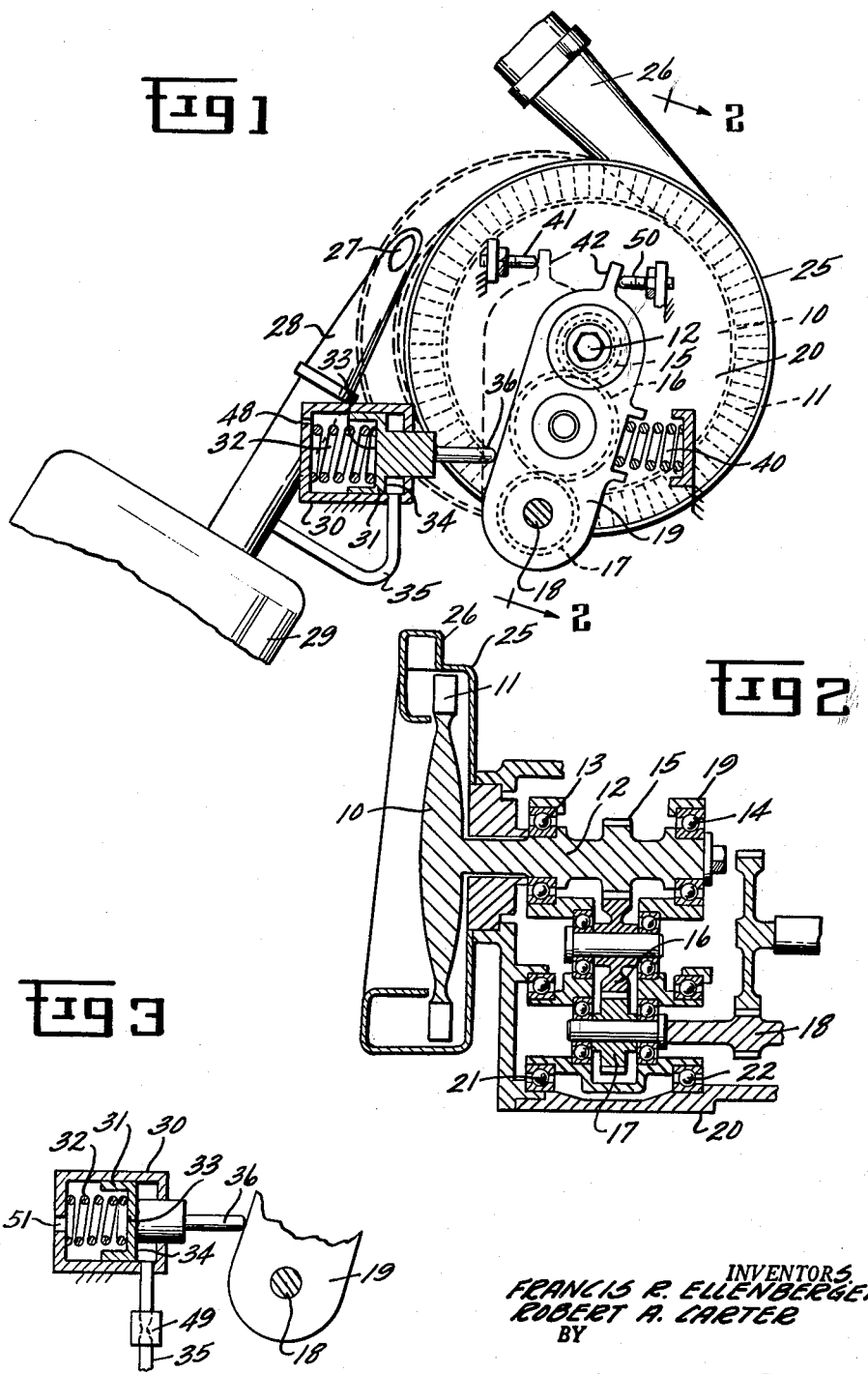

3,180,614
CONTROL SYSTEM FOR FLUID TURBINES
Francis Richard Ellenberger, Marblehead, and Robert Andrew Carter, Nahant, Mass., assignors to General Electric Company, a corporation of New York
Filed June 21, 1963, Ser. No. 289,511
10 Claims. (Cl. 253—59)

This invention relates to control systems for fluid turbines and, more particularly, to an improved control system for gas turbine starters. This invention is especially suited for use with gas turbine starters capable of being driven by either high or low pressure motive fluid.

A gas turbine starter is a relatively small gas turbine unit powered from a source of gas or other motive fluid under pressure for bringing a large gas turbine engine such as a jet engine up to self-sustaining speed. It is a common practice to supply the pressurized gas from a high pressure source such as a propellant cartridge. It will be appreciated that in such an application the load imposed by the gas turbine engine on the starter varies over a relatively wide range with speed and also with environmental conditions, particularly temperature and air density. For example, in the typical case, the load imposed on the starter at the beginning of the start cycle, except for breakaway friction, will be almost pure inertia because windage and friction losses will at this point be very small. Thus, almost the entire torque output of the starter will go into accelerating the engine. As the speed increases, however, a greater proportion of the power developed by the starter will be absorbed by the increasing windage, friction and other rotating losses of the engine, thus leaving less torque available for acceleration if the torque output of the starter has remained relatively constant.

In applications of the kind just discussed, it is often desired to provide particular acceleration characteristics, such as constant acceleration over the start cycle. Where such a requirement exists, means must be provided to adjust the torque developed by the turbine to achieve the desired acceleration level. A suitable control means for achieving the desired acceleration level for starters driven by high pressure gas is described and claimed in co-pending application entitled, "Acceleration Control for Fluid Turbines," now Patent No. 3,107,896, issued on Oct. 22, 1963, in the name of Philip Dantowitz and assigned to the assignee of this invention. In the Dantowitz patent, there is described an acceleration control system utilizing a movably mounted turbine wheel and having means for varying the degree of immersion of the wheel in the high pressure motive fluid stream. The system allows the net torque on the wheel, which is the excess in the torque generated by the high pressure motive fluid over the load reaction torque, to be controlled as a function of a reference force. In other words, the net torque on the wheel is specified by the magnitude of the reference force. When a speed dependent force varied as a function of turbine speed in accordance with one modification of Dantowitz's control system is also imposed on the wheel mounting means, the acceleration of the turbine wheel is directly proportional to the magnitude of the reference force.

The acceleration control system described and claimed by Dantowitz requires that the turbine wheel be biased into the stream of motive fluid by a relatively light reference force during cartridge operation in order to provide for the variable positioning required. It has been found that violent movement of the starter turbine wheel and its supporting yoke can result from accelerations experienced when the starter is inoperative, particularly when the starter is used in an aircraft installation. Substantial damage to the starter caused by vibration and impact forces can result from such unrestrained movements.

It is therefore an object of this invention to provide an improved control system in which undesired movement of the starter elements is prevented when the starter is inoperative.

Another consideration which enters into the design of high pressure starters is the problem of high initial torques connected with the initiation of the start cycle. These can occur, for example, from ignition pressure peaks which occur on the firing of the propellant.

It is therefore another object of this invention to provide an improved control for cartridge starters in which means are provided for limiting the magnitude of the impact torque which occurs upon ignition of the propellant.

Cartridge type starters of the type just described are particularly advantageous for use in starting aircraft jet engines since the starter and the breech containing the propellant cartridge can be mounted on the engine so as to form with the engine a "self-contained starting" unit. As a result, aircraft equipped with cartridge type starters may be operated where other sources of starting energy are not available. The cartridge must be removed after each start, however, and replaced with a new cartridge having a fresh charge of propellant.

In view of the cost and inconvenience thus associated with cartridge starting, it is often desired to utilize alternative starting arrangements whenever available. Low pressure air, which is often available from ground carts at relatively low cost at well equipped airfields, can be utilized to drive an engine starter. Unfortunately, however, inferior performance usually results when a single, combination starter is used in connection with both energy sources. In other words, cartridge type starters usually cannot be started satisfactorily with compressed air. Similarly, low pressure starters are not generally suitable for cartridge operation.

Efforts have been made in the past to provide starters having combination capabilities. In these starters, a high pressure nozzle box is provided around a portion of the starter turbine wheel periphery for directing high pressure fluid to the turbine buckets. A low pressure nozzle box is provided around the remainder of the wheel periphery for directing low pressure fluid to the buckets. Because of the relatively low energy level of the low pressure fluid, it must be supplied in large quantities in order that the torque generated on the wheel be sufficient to satisfy acceleration requirements and bring the engine up to self-sustaining speeds. A problem associated with these combination starters is that the limited nozzle area available around only a portion of the wheel periphery is not always capable of supplying the required amount of low pressure fluid. As a result, the torque generated by the low pressure fluid is not always sufficient to overcome the engine drag torque and bring the engine up to self-sustaining speed.

A further object of this invention is to provide an improved turbine starter which can be operated satisfactorily on either high or low pressure motive fluid.

A still further object of this invention is to provide a universal starter having an improved control for high pressure operation.

In accordance with an illustrated embodiment of the invention, a starter is provided with a movable wheel acceleration control system of the type described and claimed in the above-mentioned Dantowitz application. The turbine wheel can be moved between two end positions. In the first end position, the wheel is aligned with a stream of high pressure motive fluid supplied by nozzle means extending around a portion of the wheel periphery. In the second end position, the wheel is aligned with a low pressure nozzle box extending around the entire wheel periphery. A locking means is provided for engaging the yoke supporting the wheel to lock the wheel in the second end position. A releasing means is also provided for removing the locking means only when high pressure fluid is being supplied. With the locking means removed, the yoke can move the turbine wheel into and out of high pressure fluid steam in accordance with Dantowitz's teaching to vary the torque generated on the wheel by the stream and, consequently, control wheel acceleration. In addition, a time delay means is provided for limiting the rate a which the locking means is withdrawn. Thus, at light-off of the propellant, the acceleration rate is held to a much lower level than the scheduled rate and is permitted to build up smoothly. This avoids the high torque peaks otherwise associated with propellant ignition.

The features of the invention which are believed to be novel are set forth with particularity in the appended claims. The invention, however, both as to its organization and method of operation, together with further objects and advantages thereof, may best be understood by reference to the following description taken in connection with the accompanying drawing in which:

FIG. 1 is a schematic presentation of the essential elements of gas turbine starter embodying the invention;

FIG. 2 is a side view of the schematic arrangement of FIG. 1 as viewed along line 2—2; and FIG. 3 is a schematic presentation of an alternative time delay mechanism.

Referring first to FIGS. 1 and 2 of the drawing, a starter having an axial flow turbine wheel 10 is illustrated. The turbine wheel 10 has peripherally mounted buckets 11 which may be driven by either high pressure or low pressure motive fluid as will be described presently. The turbine wheel 10 is supported on a shaft 12 which is in turn rotatably supported in a pair of bearings 13 and 14. Secured to the turbine shaft 12 between the bearings 13 and 14 is a pinion 15 which drives output gears 16 and 17. The gear 17 is connected to drive an output gear train through a shaft 18. The gears 15, 16 and 17 and the turbine wheel bearings 13 and 14 are supported in a yoke 19 which is pivotably mounted in a turbine casing 20 on a pair of bearings 21 and 22.

It will thus be seen that the turbine wheel 10 is rotatably supported in movable mounting means, the yoke 19. The yoke 19 permits movement of the turbine wheel 10 through a range of positions. In the end position shown by solid lines in FIG. 1, the turbine buckets are aligned with a nozzle box 25 extending around the entire periphery of the turbine wheel 10. The nozzle box 25 is adapted to receive low pressure motive fluid through supply conduit 26 from a suitable source such as a portable air compressor (not shown) for driving the turbine wheel 10. In the end position shown by broken lines in FIG. 1, the turbine wheel 10 is positioned so that the blades 11 are aligned with a nozzle 27 connected by supply conduit 28 to a breech 29. The breech 29 contains a cartridge of solid propellant which may be ignited to supply high pressure motive fluid to the nozzle 27. The turbine wheel is precisely positioned in the end positions by means of a tang 42 on the yoke 19 which engages adjustable stops 50 and 41.

Still referring to FIG. 1, a substantially closed cylinder 30 is illustrated having a reciprocable piston 31 mounted therein. A heavy compression spring 32 engages one face 33 of the piston 31, and the other face 34 of the piston 31 is subjected to the pressure within the breech 29 through a conduit 35. Since the pressure within the breech 29 is substantially atmospheric except when the propellant is ignited, the force of the compression spring 32 originally maintains the piston 31 the position illustrated. A shaft 36 connected to the piston 31 moves therewith, the shaft 36 engaging the yoke 19 to hold the tang 42 against the stop 50 and thereby position the turbine wheel 10 in a locked position as illustrated by solid lines in FIG. 1. A second compression spring 40 also exerts a force on the yoke 19, the force exerted thereby being oppositely directly to that exerted by the compression spring 32 through piston 31 and shaft 36. While the function of the spring 40 will be described presently, it should be noted here that the force exerted by spring 32 is sufficient to overcome completely the force of spring 40.

The operation of the fluid turbine of this invention will now be described. With the compression spring 32 and the shaft 36 maintaining the turbine wheel 10 in its locked position, low pressure motive fluid such as compressed air may be supplied through supply conduit 26 to the nozzle box 25. Since the nozzle box 25 extends around the entire periphery of the turbine wheel 10, the nozzle area available is sufficient to supply the quantity of low pressure fluid required to overcome engine drag torque and bring the engine up to self-sustaining speed.

The fluid turbine of this invention may also be started with high pressure motive fluid supplied by the breech 29. When the propellant in the breech 29 is ignited, the pressure within the breech increases rapidly, the face 34 of the piston 31 being exposed to the pressure through conduit 35 as described previously. The force exerted on the piston 31 and the breach pressure is sufficient to overcome fully the force of heavy compression spring 32 and move the piston 31 to the left within the cylinder 30 as viewed in FIG. 1. With the piston 31 moved to the left, the shaft 36 is removed completely from engagement with the yoke 19. As a result, the turbine wheel 10 is no longer locked in position, but is free to move toward its position in which the blades 11 are full immersed in the high pressure stream of motive fluid being supplied by the nozzle 27. The fixed stop 41 is provided for engaging the tang 42 on the yoke 19 when the yoke moves the turbine blades 11 into the fully immersed position.

In practice, the turbine wheel 10 seldom moves all of the way to the fully immersed position. The degree of immersion of the turbine blades 11 in the high pressure motive fluid stream is controlled by the magnitude of the reference force applied to the yoke 19 by the compression spring 40. The operation of the basic movable wheel system in which the acceleration of the turbine wheel is controlled in response to a reference force applied to a movable mounting means is fully described in the above-mentioned Dantowitz application. Suffice it to say here, therefore, that the net torque on the turbine wheel 10, which is defined as the difference between the torque generated on the wheel by the high pressure motive fluid and the load reaction torque, may be controlled as a function of the magnitude of the reference force applied to the movable mounting means, in this case the pivotably mounted yoke 19. Also in accordance with Dantowitz's teaching, means (not illustrated here) may be provided for applying on the yoke 19 a speed dependent force which substantially balances the speed dependent characteristics of the torque resulting from the wheel losses. Thus, the acceleration rate of the wheel 10 may be made directly proportional to the magnitude of the reference force applied by the compression spring 40. As pointed out previously, pressure peaks may occur on initial firing of the propellant charge. If the turbine blades 11 are allowed to move into the high pressure fluid stream too rapidly, excessive torque peaks may be developed on the turbine wheel 10. It is therefore desirable to provide time delay means for preventing substantial movement of the wheel into the gas stream until after these initial transients have subsided. To provide this function, the cylinder 30 as viewed in FIG. 1 is provided with an orifice 48 having a relatively small area. The orifice 48 limits the rate at which the shaft 36 can be withdrawn from engagement with the yoke 19. When the propellant charge is ignited, the pressure increases rapidly and exerts a force on the face 34 of the piston 31. As the piston 31 moves to the left as viewed in FIG. 1, the air within the cylinder 30 can only escape through the orifice 48, the orifice being sized to allow the shaft 36 to be withdrawn from engagement with the yoke 19 at the desired rate. Following the start cycle, the compression spring 32 again forces the piston 31 to the right and the shaft 36 into engagement with the movable yoke 19.

Referring now to FIG. 3, an alternative time delay means is illustrated. A flow limiting orifice 49 is provided in the high pressure conduit 35 which connects the breech 29 to the cylinder 30. The function of the flow limiting orifice 49 is to limit the rate at which the pressure in the cylinder 30, and hence the magnitude of the force applied on the face 34 of the piston 31, can build up. As above, the ultimate result is to limit the rate at which the turbine blades 11 move into the high pressure stream. An orifice 51 similar to the orifice 48 is provided for venting, the orifice 51 having a substantially greater flow area than the orifice 48. Orifice 51 therefore does not significantly limit the rate at which the turbine wheel 10 moves into the high pressure fluid stream.

This invention also provides for locking of the turbine wheel 10 when the starter is inoperative. As described above, the force exerted by spring 32 is sufficient to overcome completely the force of spring 40 and thereby lock the yoke 19 against the stop 50 except when it is released in the manner discussed above. As a result, the turbine wheel 10 and its supporting yoke 19 are not free to move in response to accelerations experienced when the starter is inoperative. As a result, substantial damage to the starter caused by vibration and impact forces resulting from unrestrained movement of the wheel 10 and the yoke 19 is prevented.

It will thus be seen that this invention provides an improved gas turbine starter capable of being driven by either high or low pressure motive fluid. The starter of this invention also has an improved control system which prevents undesired movement of the starter elements when the starter is inoperative and which limits the magnitude of the impact torque which occurs upon ignition of the propellant.

While preferred embodiments of this invention have been described, it will be obvious to those skilled in the art that various changes and modifications may be made without departing from the invention, and it is therefore intended to cover in the appended claims all such changes and modifications as fall within the true spirit and scope of the invention.

What is claimed as new and desired to secure by Letters Patent of the United States is:

1. A fluid turbine control arrangement comprising:
   (a) a turbine wheel having a row of turbine buckets peripherally mounted thereon,
   (b) supply means adapted to supply a stream of motive fluid,
   (c) movable mounting means rotatably supporting said turbine wheel and adapted to move said wheel between a first end position in which the fluid stream exerts maximum torque on said wheel and a second end position,
   (d) means engaging said movable mounting means to lock said turbine wheel in said second end position,
   (e) means removing said locking means from engagement with said movable mounting means when a high pressure stream of motive fluid is being supplied so as to permit movement of said turbine wheel through said range of positions,
   (f) and control means effective when said locking means is removed from engagement with said mounting means locating said movable mounting means and said wheel within said range of positions such that a desired torque is exerted on said wheel by the fluid stream.

2. A fluid turbine control arrangement comprising:
   (a) an axial flow turbine wheel having a row of turbine buckets peripherally mounted thereon,
   (b) supply means adapted to supply a stream of motive fluid,
   (c) movable mounting means rotatably supporting said turbine wheel and adapted to move said wheel between a first end position in which the fluid stream exerts maximum torque on said wheel and a second end position,
   (d) means engaging said movable mounting means to lock said turbine wheel in said second end position,
   (e) means removing said locking means from engagement with said movable mounting means when a high pressure stream of motive fluid is being supplied so as to permit movement of said turbine wheel through said range of positions,
   (f) and control means effective when said locking means is removed from engagement with said mounting means locating said movable mounting means such that said turbine wheel is in an equilibrium position within said range of positions in which the actual net torque on the wheel is equal to a desired net torque.

3. A fluid turbine control arrangement as set forth in claim 2 in which the means removing the locking means from engagement with said mounting means is in fluid communication with said supply means and is actuated by the pressure of said supply means to remove the locking means when high pressure fluid is being supplied to the turbine wheel.

4. A fluid turbine control arrangement as set forth in claim 2 including time delay means associated with the means which removes the locking means from engagement with said mounting means for limiting the rate at which said locking means is removed.

5. A fluid turbine control arrangement comprising:
   (a) an axial flow turbine wheel having a row of turbine buckets peripherally mounted thereon,
   (b) movable mounting means rotatably supporting said turbine wheel and adapted to move said wheel through a range of positions bounded by first and second end positions,
   (c) first supply means positioned to direct a high pressure fluid stream to the turbine buckets and to exert a maximum torque on said turbine wheel when said wheel is in said first end position,
   (d) second supply means positioned to direct a low pressure fluid stream to the turbine buckets around the entire periphery of said turbine wheel when said wheel is in said second end position,
   (e) means engaging said movable mounting means to lock said turbine wheel in said second end position,
   (f) means removing said locking means from engagement with said movable mounting means when a high pressure stream of motive fluid is being supplied so as to permit movement of said turbine wheel through said range of positions,
   (g) and control means effective when said locking means is removed from engagement with said mounting means locating said movable mounting means such that said turbine wheel is in an equilibrium position within said range of positions in which the actual net torque on the wheel is equal to a desired net torque.

6. A fluid turbine control arrangement as set forth in claim 5 in which the means removing the locking means from engagement with said mounting means is in fluid communication with said supply means and is actuated by the pressure of said first supply means to remove the locking means when high pressure fluid is being supplied to the turbine wheel.

7. A fluid turbine control arrangement as set forth in claim 5 including time delay means associated with the means which removes the locking means from engagement with said mounting means for limiting the rate at which said locking means is removed.

8. A fluid turbine control arrangement comprising:
(a) an axial flow turbine wheel having a row of turbine buckets peripherally mounted thereon,
(b) movable mounting means rotatably supporting said turbine wheel and adapted to move said wheel through a range of positions bounded by first and second end positions,
(c) first supply means positioned to direct a high pressure fluid stream to the turbine buckets and to exert maximum torque on said turbine wheel when said wheel is in said first end position,
(d) second supply means positioned to direct a low pressure fluid stream to the turbine buckets around the entire periphery of said turbine wheel when said wheel is in said second end position,
(e) a cylinder,
(f) a piston reciprocably mounted in said cylinder,
(g) locking means connected to said piston for movement therewith between an extended position and a retracted position,
(h) said locking means engaging said movable mounting means in said extended position to lock said turbine wheel in said second end position and said locking means removed from engagement with said movable mounting means in said retracted position so as to permit movement of said turbine wheel through said range of positions,
(i) means imposing a reference force on said piston in a direction to move said locking means to said extended position,
(j) fluid communication means between said first supply means and said cylinder to supply pressurized fluid to said cylinder when high pressure fluid is being supplied to the turbine buckets,
(k) the total force exerted on said piston by the pressure of a stream of motive fluid being supplied by said first supply means being oppositely directed and sufficient to overcome said reference force and move said locking means to said retracted position, thereby permitting movement of said turbine wheel through said range of positions,
(l) and control means effective when said locking means is in said retracted position locating said movable mounting means such that said turbine wheel is in an equilibrium position within said range of positions in which the actual net torque on the wheel is equal to a desired net torque.

9. A fluid turbine control arrangement as set forth in claim 8 including time delay means for limting the rate at which said locking means is moved from said extended position to said retracted position.

10. A fluid turbine control arrangement comprising:
(a) a turbine wheel having a row of turbine buckets peripherally mounted thereon,
(b) movable mounting means rotatably supporting said turbine wheel and adapted to move said wheel through a range of positions bounded by first and second end positions,
(c) first supply means positioned to direct a high pressure fluid stream to the turbine buckets and to exert a maximum torque on said turbine wheel when said wheel is in said first end position,
(d) second supply means positioned to direct a low pressure fluid stream to the turbine buckets when said wheel is in said second end position,
(e) means engaging said movable mounting means to lock said turbine wheel in said second end position,
(f) means removing said locking means from engagement with said movable mounting means when a high pressure stream of motive fluid is being supplied by said first supply means so as to permit movement of said turbine wheel through said range of positions,
(g) and control means effective when a high pressure stream of motive fluid is being supplied by said first supply means and said locking means is removed from engagement with said movable mounting means such that said turbine wheel is is an equilibrium position within said range of positions in which a desired torque is exerted on said wheel by the high pressure fluid stream.

References Cited by the Examiner
UNITED STATES PATENTS

| 2,565,178 | 8/51 | Imbert. | |
| 2,609,661 | 9/52 | Nardone | 253—59 X |
| 2,612,757 | 10/52 | Teague | 253—59 X |
| 2,614,798 | 10/52 | Rubbra | 253—59 |
| 2,685,428 | 8/54 | Tressl | 253—59 X |
| 2,689,707 | 9/54 | Graham et al. | 253—59 |
| 3,094,311 | 6/63 | Goldstein | 253—59 |
| 3,107,896 | 10/63 | Dantowitz | 253—59 |

FOREIGN PATENTS 1,074,095  3/54  France.

JULIUS E. WEST, *Primary Examiner.*